(12) United States Patent
Shetler, Jr. et al.

(10) Patent No.: US 9,000,613 B2
(45) Date of Patent: Apr. 7, 2015

(54) UPS ADAPTIVE OUTPUT VOLTAGE CONTROL SYSTEMS

(75) Inventors: Russell E. Shetler, Jr., Delaware, OH (US); David Sonner, Galena, OH (US)

(73) Assignee: Liebert Corporation, Columbus, OH (US)

( * ) Notice: Subject to any disclaimer, the term of this patent is extended or adjusted under 35 U.S.C. 154(b) by 516 days.

(21) Appl. No.: 13/465,273

(22) Filed: May 7, 2012

(65) Prior Publication Data

US 2012/0306274 A1 Dec. 6, 2012

Related U.S. Application Data

(60) Provisional application No. 61/492,953, filed on Jun. 3, 2011.

(51) Int. Cl.
*H02J 9/06* (2006.01)
*H02J 9/00* (2006.01)

(52) U.S. Cl.
CPC ....................... *H02J 9/062* (2013.01)

(58) Field of Classification Search
USPC ........................................................... 307/64
See application file for complete search history.

(56) References Cited

U.S. PATENT DOCUMENTS 6,917,124 B2 7/2005 Shetler et al.
2014/0139022 A1* 5/2014 Bush et al. ...................... 307/31

* cited by examiner

*Primary Examiner* — Robert Deberadinis
(74) *Attorney, Agent, or Firm* — Harness, Dickey & Pierce, P.L.C.

(57) ABSTRACT

An uninterruptible power supply includes a rectifier coupled to an input of an uninterruptible power supply and converts a first alternating current having a first alternating current voltage to a direct current. An inverter is coupled to an output of the uninterruptible power supply and converts the direct current to a second alternating current having a second alternating current voltage. A bypass switch bypasses the rectifier and the inverter and provides a bypass power from the input to the output when in a bypass state. A control module switches the bypass switch to the bypass state when in a bypass mode and switches the bypass switch to a non-bypass state when in a UPS mode. The control module adjusts the second alternating current voltage between first and second voltage levels when in an adaptive voltage control mode after switching from the bypass mode to the UPS mode.

20 Claims, 7 Drawing Sheets

UPS ADAPTIVE OUTPUT VOLTAGE CONTROL SYSTEMS

CROSS-REFERENCE TO RELATED APPLICATIONS

This application claims the benefit of U.S. Provisional Application No. 61/492953, filed on Jun. 3, 2011. The disclosure of the above application is incorporated herein by reference in its entirety.

FIELD

The present disclosure relates generally to uninterruptible power supplies, and more particularly to voltage control of uninterruptible power supplies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Uninterruptible power supplies (UPSs) are used in supplying power to data centers. In this regard, UPSs in addition to providing back-up power to the data centers in the event of interruption of power from an electric utility, may also condition the power from the electric utility. An electric utility substation down converts utility power to generate substation power that is supplied to the UPSs, which conditions the substation power. Each of the UPSs has a source of backup power that provides power in the event of an interruption in the utility power. The UPSs may supply power to, for example, one or more power supplies of one or more servers of the data center.

A data center may have multiple loads (e.g., servers). Each of the loads has a power supply (load power supply) that may operate over a range of input voltages. Efficiency of the load power supplies may vary based on their input voltages. As such, each load power supply may have a corresponding input voltage at which the load power supply operates at a maximum efficiency level. For example, a load power supply may be capable of operating with input voltages ranging from 208 VAC to 240 VAC. The load power supply may however operate at a maximum efficiency level when it has a 240 VAC input voltage. In this regard, commonly used server power supplies in the United States typically operate at a maximum efficiency when their input voltages are 240 VAC.

One or more uninterruptible power supplies (UPSs) may be used to provide output voltage(s) to the load power supplies of the data center. The UPSs receive power from a substation at a substation voltage (e.g., 208 VAC) and may each be configured to provide output power at a fixed nominal output voltage. The UPS may typically have a UPS mode and a bypass mode. When in the UPS mode, the UPSs may regulate, filter and condition a substation voltage to provide the output power. Each of the UPSs may include a bypass switch that, when the UPS is in the bypass mode, is in a bypass state (e.g., closed) and provides the power from the utility at the substation voltage directly to the load power supplies. This may be performed when a failure occurs in the UPS or the input power from the utility is clean enough that conditioning is not required. In the bypass mode, components (e.g., transformers, rectifier(s), inverter(s), etc.) of a UPS are bypassed to provide the power from the utility at the substation voltage directly to the output of the UPS and thus directly to the load power supplies.

If the UPSs are configured to raise the voltage of the power from the substation voltage (referred to herein as the "static bypass voltage") to higher voltages than the substation voltage, such as 240 VAC, for maximum operating efficiencies of the load power supplies (referred to herein as "efficient voltages"), the output voltages of the UPSs may suddenly drop. This may occur when the UPS switches from the UPS mode to the bypass mode. Using the United States as an example, when a UPS switches from the UPS mode to the bypass mode, the output voltage of the UPS may suddenly drop from an efficient voltage level of 240 VAC to the static bypass voltage level of 208 VAC. This sudden drop in voltage can negatively affect operation of the load power supplies and/or the corresponding loads.

To prevent voltage drops during bypass events, the UPSs may be configured to provide the same output voltage(s) in UPS mode to the load power supplies that are provided during bypass mode, such as a 208 VAC output in each mode. This however prevents the load power supplies and/or the corresponding loads from operating at maximum efficiency levels.

SUMMARY

In an aspect, an uninterruptible power supply is provided. The uninterruptible power supply has a rectifier coupled to an input of the uninterruptible power supply that converts a first alternating current having a first alternating current voltage to a direct current. The uninterruptible power supply also includes an inverter coupled to an output of the uninterruptible power supply that converts direct current provided by the direct current bus to a second alternating current having a second alternating current voltage. A bypass switch has a bypass state and a non-bypass state, wherein the bypass switch is configured to bypass the rectifier and the inverter and provide a bypass voltage from the input to the output when in the bypass state. A control module operates in a bypass mode and a UPS mode. The control module switches the bypass switch to the bypass state when in the bypass mode and switches the bypass switch to the non-bypass state when in the UPS mode. The control module, when in the UPS mode, further operates in a normal UPS mode and an adaptive voltage control mode. When operating in the adaptive voltage control mode, the control module adjusts the second alternating current voltage from a first level to a second level upon switching from the bypass mode to the UPS mode.

In an aspect, a method of operating an uninterruptible power supply is provided. The method includes converting a first alternating current to a direct current via a rectifier and converting the direct current to a second alternating current at a second alternating current voltage via an inverter. The method further includes determining whether to operate the uninterruptible power supply in a bypass mode or a UPS mode. The method includes switching a bypass switch to a bypass state when in the bypass mode and the rectifier and the inverter are bypassed when operating in the bypass mode by providing power at a bypass voltage from an input of the uninterruptible power supply through the bypass switch to an output of the uninterruptible power supply. The bypass switch is switched to a non-bypass state when in the UPS mode. When operating in an adaptive control mode in the UPS mode, adjusting the second alternating current voltage between a first voltage level and a second voltage level after switching from the bypass mode to the UPS Mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The implementations disclosed herein address and overcome the above-described issues. The implementations include adaptive voltage output control of a UPS and allow for efficient server (or load) operation. The adaptive voltage output control manages drops in voltages supplied from the UPS to a server power supply (or load) in the event the UPS switches from a UPS mode to a bypass mode. When the UPS switches from the bypass mode to the UPS mode and adaptive voltage output control is selected, the adaptive voltage output control also ramps the output voltage of the UPS from a static bypass voltage to an efficient voltage level. If adaptive voltage output control is not selected, the UPS provides an output voltage at the static bypass voltage when in the UPS mode.

Figure 1:
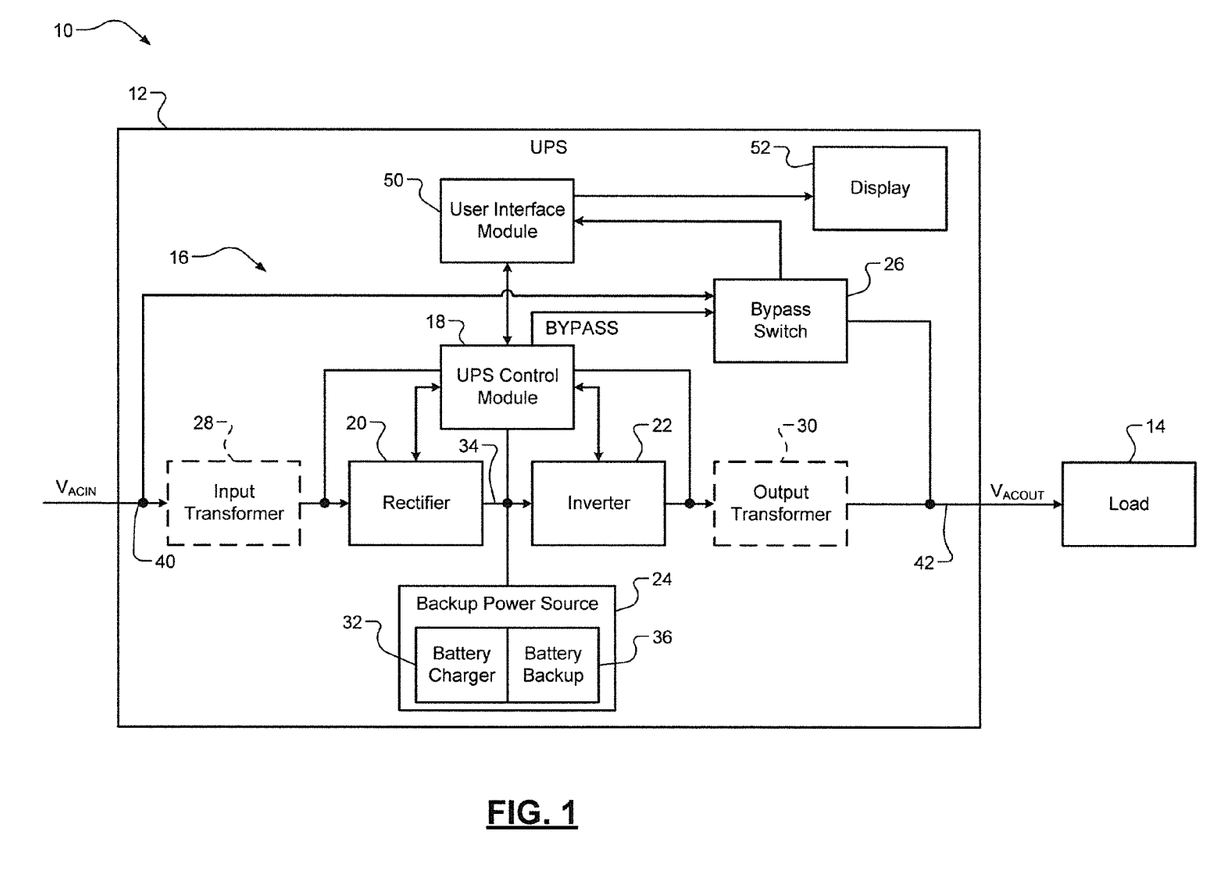
FIG. 1 is a functional block diagram of a UPS system in accordance with an aspect of the present disclosure.

In FIG. 1, a UPS system 10 is shown. The UPS system 10 may include one or more UPSs (one UPS 12 is shown) that supply AC power to one or more loads (one load 14 is shown). Each of the UPSs may supply power to one or more loads. The UPSs 10 may be connected in parallel to provide more power capacity. The load(s) may include, for example, one or more server power supplies, network switches and devices, telecommunication switches and devices, audio/video hubs and devices, air conditioning units, medical devices and equipment, industrial devices and equipment, etc.

The UPS 12 includes a double conversion UPS power circuit 16 and a UPS control module 18. The UPS power circuit 16 includes a rectifier 20 and an inverter 22. UPS 12 also includes a backup power source 24 and a bypass switch 26. The double conversion UPS power circuit 16 may also include an input transformer 28 and/or an output transformer 30, as shown. The UPS control module 18 may not include the transformers 28, 30. The UPS control module 18 may include a digital signal processor with embedded software that detects current, voltage and power parameters in the double conversion UPS power circuit 16. The UPS control module 18 monitors inputs and outputs of devices in UPS 12, and controls operation of the double conversion UPS power circuit 16, backup power source 24 and bypass switch 26 based on the inputs and outputs.

The UPS control module 18 may control operation of rectifiers, inverters, transformers, chargers and other circuit elements of the double conversion UPS power circuit 16, such as switching power devices (not shown). The UPS control module 18 may, for example: select and set a mode of operation; maintain voltage and current levels at the output of the UPS 12 and thus on the load 14; and ramp output voltage levels of the output power of the UPS 12 between a static bypass voltage (e.g., 208 VAC) and an efficient voltage level (e.g., 240 VAC). The UPS control module 18 may also provide limits (e.g., limiting current supplied to the load 14), set fault conditions, set event conditions, and set alarm conditions and control operation of the UPS 12 based on these conditions. Other features and operations of the UPS control module 18 are described below.

The rectifier 20, the inverter 22 and the transformers 28, 30 are connected in series between a main AC source (e.g., substation voltage source, regulated utility power source, generator, fuel cell, etc.) and the load 14. The main AC source supplies AC power to the input transformer 28, which in turn supplies AC power to the rectifier 20. The rectifier 20 functions as an AC/DC converter and converts AC to DC, which is provided to a DC bus 34. The DC bus 34 is coupled to an output of rectifier 20 and to an input of the inverter 22. The inverter functions as a DC/AC converter and converts DC on the DC bus 34 to AC that is provided at an output of the inverter 22. The backup power source 24 provides power for the load 14 (for example, by providing a backup source of DC) when power from the main AC source is lost or is sufficiently degraded (e.g., improper voltage level, improper current levels, etc.) such that it can't be used. The backup power source 24 may include one or more of a backup battery (which may be a battery bank), a flywheel, a fuel cell, etc.

When the UPS 12 is operating in the UPS mode, power is supplied to the load 14 from the main AC source through the rectifier 20 and the inverter 22. This provides regulated and filtered power with minimal irregularities, such as voltage spikes, frequency deviations or phase deviations. In one circuit topology, the rectifier 20 provides power to the inverter 22 and to a battery charger 32 of the backup power source 24 via a DC bus 34. The rectifier 20 may be a pulse width modulated (PWM) rectifier. The battery charger 32 charges, for example, battery backup 36. In another topology, when the battery backup is directly connected to the DC bus 34, the rectifier 20 may be a phase controlled rectifier and used to charge the battery backup without use of a separate battery charger.

Continuing from the same example, when power from the main AC source is interrupted, the UPS 12 switches to a back-up mode and power is supplied from the backup power source 24 to the inverter 22 instead of from the main AC source. This allows power to be maintained on the load 14 without interruption. When the battery backup 36 is directly connected to the DC bus 34 and when the power from the main AC source is interrupted, power is supplied directly from the battery backup 36 to the DC bus 34 and not through the rectifier 20. The described UPS 12 provides uninterruptible clean AC power. The voltage provided to the load 14 is regulated. The voltage provided to the DC bus 34 by the battery backup 36 may not be regulated and decreases as energy is drawn from the battery backup 36.

The input transformer 28 may isolate the main AC source from the rectifier 20. The rectifier 20 may directly receive power from the main AC source having a first AC voltage $V_{ACIN}$ of, for example, 208 VAC. The first AC voltage $V_{ACIN}$ may be referred to as the static bypass voltage. The input transformer 28 may convert the first AC voltage $V_{ACIN}$ to a transformer supply voltage (second AC voltage $V_{RECTIN}$), such as for example, 208 VAC. The second AC voltage $V_{RECTIN}$ may be less than or equal to the first AC voltage $V_{ACIN}$. The input transformer 28 may include one or more filters and/or cancel certain harmonics in the power from the main AC source.

The rectifier 20 converts the second AC voltage (or transformer supply voltage) $V_{RECTIN}$ from the input transformer 28 to a DC bus voltage $V_{RECTOUT}$, which is provided to the DC bus 34. Control and operation of the rectifier 20 are further described below with respect to FIGS. 2-3 and 6-8.

The inverter 22 converts the DC bus voltage $V_{RECTOUT}$ (or $V_{INVIN}$) on the DC bus 34 to a third AC voltage $V_{INVOUT}$ of, for example, 208 VAC. The third AC voltage $V_{INVOUT}$ may be less than or equal to the first AC voltage $V_{ACIN}$ and equal to the second AC voltage $V_{RECTIN}$. The third AC voltage $V_{INVOUT}$ may be provided to the output transformer 30. The output transformer 30 converts the third AC voltage $V_{INVOUT}$ to an AC output voltage (fourth AC voltage) $V_{ACOUT}$, such as 208 VAC, which is provided to the load 14.

The UPS 12 may operate in a bypass mode, a UPS mode and a back-up mode. When in the UPS mode, the UPS 12 may operate in a normal UPS mode or in an adaptive voltage control mode. The UPS control module 18 controls the operating mode and control devices of the UPS 12 based on the operating mode. When in the bypass mode, the control module 18 may signal the bypass switch 26 to be in its bypass state via a bypass control signal BYPASS. The bypass switch 26 is connected in parallel with the input transformer 28, the rectifier 20, the inverter 22, and the output transformer 30. The bypass switch 26 is connected to an input 40 of the UPS 12 and/or the input transformer 28 and to an output 42 of the UPS 12 and/or the output transformer 30. While in the bypass state, the bypass switch 26 provides AC power having the first AC voltage $V_{ACIN}$ directly from the main AC source to the output 42 of UPS 12 and thus directly to the load 14. As a result, the input transformer 28, the rectifier 20, the inverter 22, and the output transformer 30 are bypassed. It should be understood that the bypass switch 26 could be coupled to a source of AC power other than the source connected to the input of the UPS 12.

When the UPS 12 is in the UPS mode, the UPS control module 18 controls the bypass switch 26 to be in its non-bypass state and AC power is thus not provided directly from the main AC source to the output 42 of the UPS 12. The load 14 is provided power via the rectifier 20, the inverter 22, and the transformers 28, 30. The load 14 may be provided with a constant voltage when the UPS 12 is in the normal UPS mode. For example, the AC output voltage $V_{ACOUT}$ may be set at the static bypass voltage when the UPS 12 is in the normal UPS mode. When the UPS 12 is in the adaptive voltage control mode, the UPS control module 18 may increase (or ramp up) the AC output voltage $V_{ACOUT}$ from a static bypass voltage to a set adaptive voltage and/or decrease (or ramp down) the AC output voltage $V_{ACOUT}$ from the set adaptive voltage to the static bypass voltage. The set adaptive voltage may for example be the efficient voltage level described above which provides the load 14 power at a voltage that maximizes operating efficiency of the load 14.

The UPS 12 may also include a user interface module 50 that is in communication with the UPS control module 18 and provides input settings for system parameters. The user interface module 50 may be used to set voltage levels, current limitations, and power limitations for the devices 20, 22, 28, 30 of the UPS 12 and the AC load 14. Current and voltage levels in and out of, for example the rectifier 20, the inverter 22, and the output transformer 30 may be regulated, monitored, adjusted, and limited separately and/or independently of each other or in a dependent manner. The user interface module 50 may also be used to select automatic and manual operating modes. During the automatic mode, the UPS control module 18 may select the bypass mode and the UPS mode (normal or adaptive voltage control mode) based on states (e.g., input and output current and voltage levels) of the rectifier 20, the inverter 22 and/or the output transformer 30. During the manual mode, a user may manually select the bypass mode and the UPS mode (normal or adaptive voltage control mode).

The UPS 12 may also include a display 52, which may be used to indicate the voltage, current, and power statuses of the inputs and outputs of various devices of the UPS 12. A user may perform appropriate tasks based on the displayed information including selecting the automatic, manual, bypass, and UPS (normal or adaptive voltage control) modes.

Figure 2:
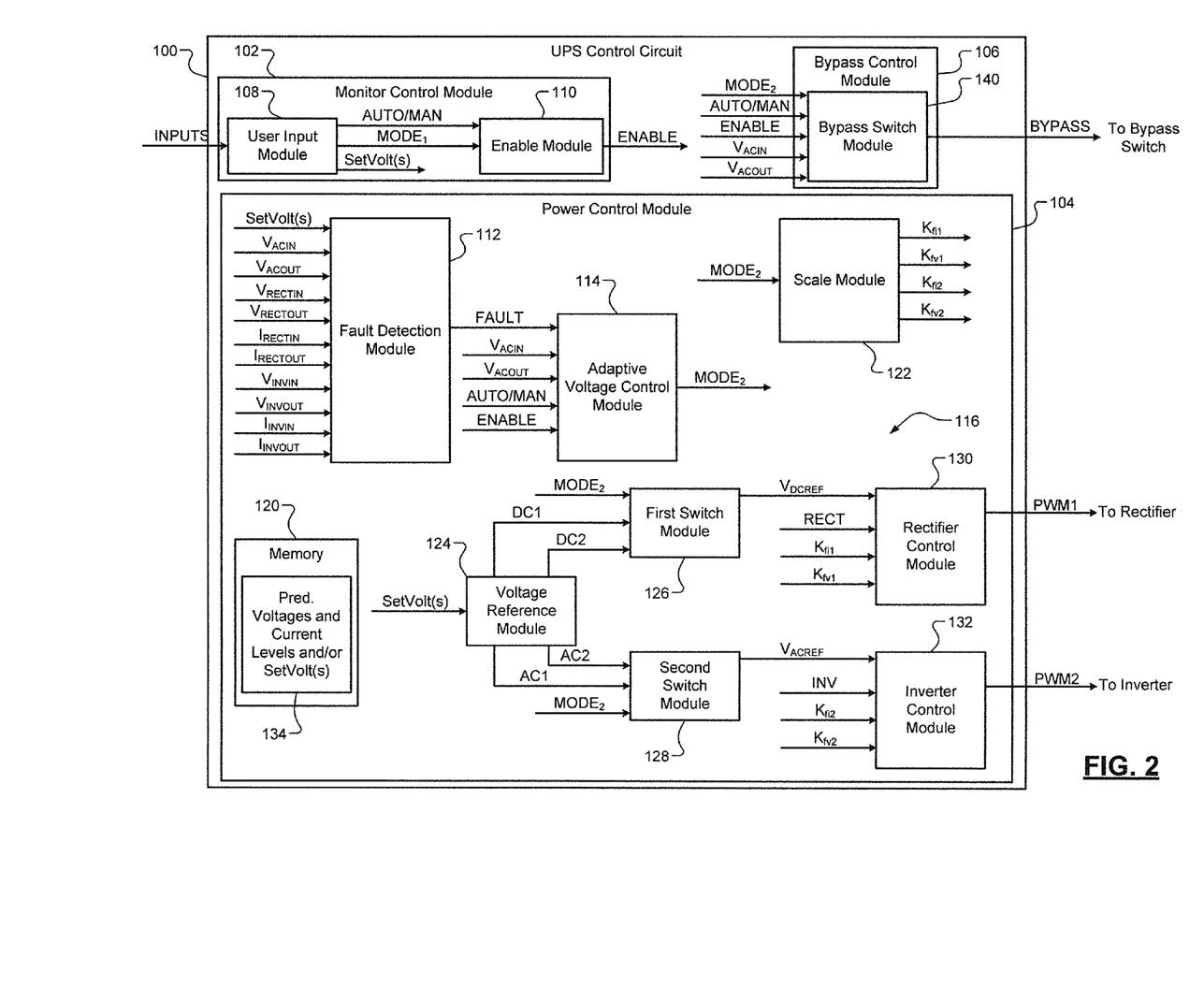
FIG. 2 is a functional block diagram of a UPS control circuit in accordance with an aspect of the present disclosure.
Figure 5:
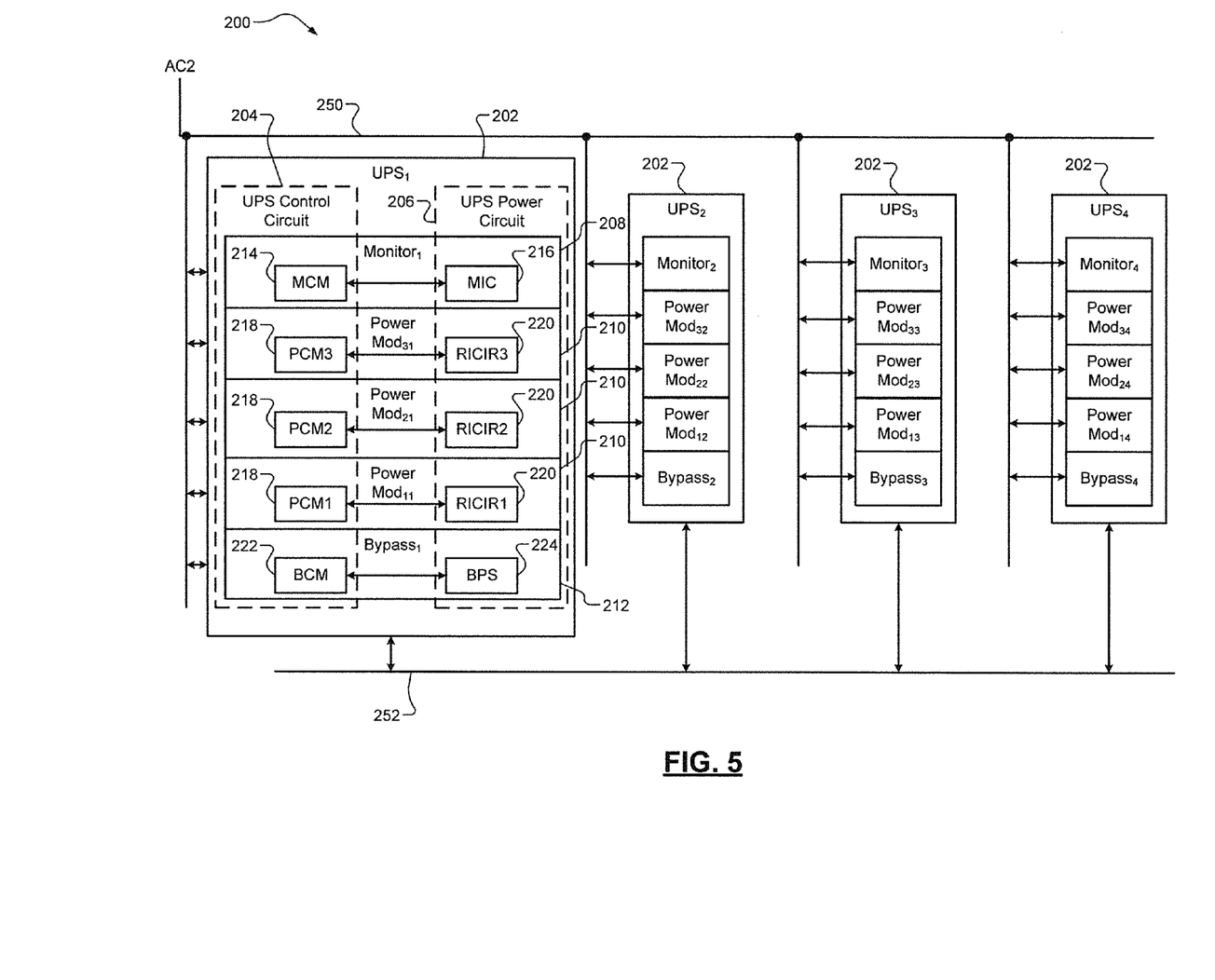
FIG. 5 is a functional block diagram of a modular UPS control system in accordance with an aspect of the present disclosure.

Referring now also to FIG. 2, a UPS control circuit 100 is shown. The UPS control module 18 of FIG. 1 may include or be replaced by UPS control circuit 100. The UPS control circuit 100 includes a monitor control module 102, a power control module 104, and a bypass control module 106. The modules 102, 104 and 106 may be included as part of a single UPS control module (e.g., the UPS control module of FIG. 1), or may be distinct modules as shown and communicate via one or more controller area networks (CANs). Example CANs are shown in FIG. 5.

The monitor control module 102 may include a user input module 108 and an enable module 110. The user input module 108 receives an input signal INPUTS from the user interface module 50 and generates a control signal AUTO/MAN, a first mode signal $MODE_1$, and a voltage setting signal SetVolt(s). The enable module 110 generates an enable signal ENABLE to enable the UPS mode and/or the adaptive voltage control module based on the control signal AUTO/MAN and the first mode signal $MODE_1$. The enable signal ENABLE may be set, for example, HIGH when the automatic mode is selected and/or when the first mode signal $MODE_1$ indicates operating in the UPS mode and/or the adaptive voltage control mode. The enable signal ENABLE may be set HIGH when the manual mode is selected and the first mode signal $MODE_1$ indicates operating in the UPS mode and/or the adaptive voltage control mode. The enable signal ENABLE may be set LOW when the manual mode is selected and the first mode signal $MODE_1$ indicates operating in the bypass mode. Although not shown, the monitor control module 102 may provide voltages and/or voltage signals $V_{ACIN}$, $V_{ACOUT}$, $V_{RECTIN}$, $V_{RECTOUT}$, $V_{INVIN}$, $V_{INVOUT}$, and SetVolt(s) ("the voltages") and current levels and/or current signals $I_{RECTIN}$, $I_{RECTOUT}$, $I_{INVIN}$, and $I_{INVOUT}$ ("the current levels") to the user interface module 50 for user monitoring via the display 52.

The power control module 104 may include a fault detection module 112, an adaptive voltage control module 114 and a rectifier and inverter (RI) control circuit 116. The fault detection module 112 may detect, receive and/or monitor at least one parameter of a device of the UPS 12, such as the voltages $V_{ACIN}$, $V_{ACOUT}$, $V_{RECTIN}$, $V_{RECTOUT}$, $V_{INVIN}$, $V_{INVOUT}$, and SetVolt(s). The voltages $V_{ACIN}$, $V_{ACOUT}$, $V_{RECTIN}$, $V_{RECTOUT}$, $V_{INVIN}$, $V_{INVOUT}$, and SetVolt(s) may be received as voltage signals from the rectifier 20, the inverter 22, the input transformer 28, and/or the output transformer 30. As an alternative, the voltages $V_{ACIN}$, $V_{ACOUT}$, $V_{RECTIN}$, $V_{RECTOUT}$, $V_{INVIN}$, $V_{INVOUT}$, and SetVolt(s) may be signals generated by the UPS control module 18 that represent actual input and output voltages of the UPS 12, the rectifier 20, the inverter 22, the transformers 28, 30 and the voltage setting signal SetVolt(s). For example, the voltages $V_{ACIN}$, $V_{ACOUT}$, $V_{RECTIN}$, $V_{RECTOUT}$, $V_{INVIN}$, $V_{INVOUT}$, and SetVolt(s) may be binary signals (or other suitable signals) that indicate the stated voltages. It should thus be understood that the terms $V_{ACIN}$, $V_{ACOUT}$, $V_{RECTIN}$, $V_{RECTOUT}$, $V_{INVIN}$, $V_{INVOUT}$, and SetVolt(s) will mean the actual voltages or parameters indicative of the actual voltages, as the context dictates.

The fault detection module 112 may also detect, receive and/or monitor current in and out of the rectifier 20 and the inverter 22. These current levels are shown as current signals $I_{RECTIN}$, $I_{RECTOUT}$, $I_{INVIN}$, and $I_{INVOUT}$, which may indicate the current levels of the rectifier 20 and inverter 22 as voltages, binary words, or other suitable indicators. For example, the current level of the current received by the rectifier 20 may be indicated by the current signal $I_{RECTIN}$, where the current signal $I_{RECTIN}$ has a voltage or is a binary signal indicative of the current level. The fault detection module 112 detects fault(s) in the UPS 12 and/or is associated with one or more of the devices of the UPS 12 based on the voltages $V_{ACIN}$, $V_{ACOUT}$, $V_{RECTIN}$, $V_{RECTOUT}$, $V_{INVIN}$, $V_{INVOUT}$, and SetVolt(s) and the current levels $I_{RECTIN}$, $I_{RECTOUT}$, $I_{INVIN}$, and $I_{INVOUT}$. The fault detection module 112 generates a fault signal FAULT based on the detected fault(s). Predetermined values and/or values selected by the user interface of the voltages $V_{ACIN}$, $V_{ACOUT}$, $V_{RECTIN}$, $V_{RECTOUT}$, $V_{INVIN}$, $V_{INVOUT}$, and SetVolt(s) and the current levels $I_{RECTIN}$, $I_{RECTOUT}$, $I_{INVIN}$, and $I_{INVOUT}$ may be stored in memory 120.

The adaptive voltage control module 114 selects an operating mode including the bypass mode or the UPS mode based on the voltages $V_{ACIN}$, $V_{ACOUT}$, the control signal AUTO/MAN, the enable signal ENABLE, and the fault signal FAULT. The adaptive voltage control module 114 also selects, when in the UPS mode, the normal UPS mode or the adaptive voltage control mode based on the voltages $V_{ACIN}$, $V_{ACOUT}$, the control signal AUTO/MAN, the enable signal ENABLE, and the fault signal FAULT. The adaptive voltage control module 114 generates a second mode signal $MODE_2$, which indicates the selected operating mode. Operation of the adaptive voltage control module 114 is further described with respect to FIGS. 6-8.

Figure 3:
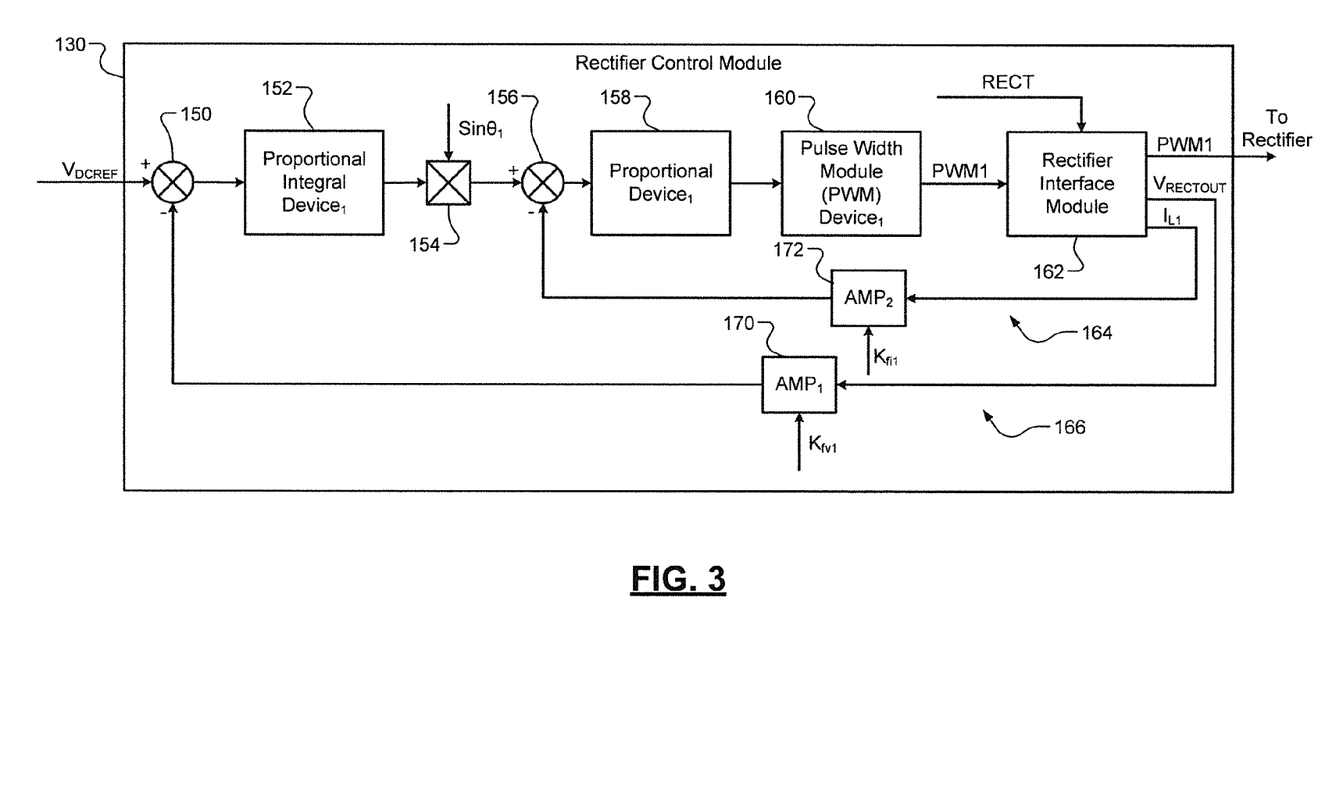
FIG. 3 is a functional block diagram of a rectifier control module in accordance with an aspect of the present disclosure.
Figure 4:
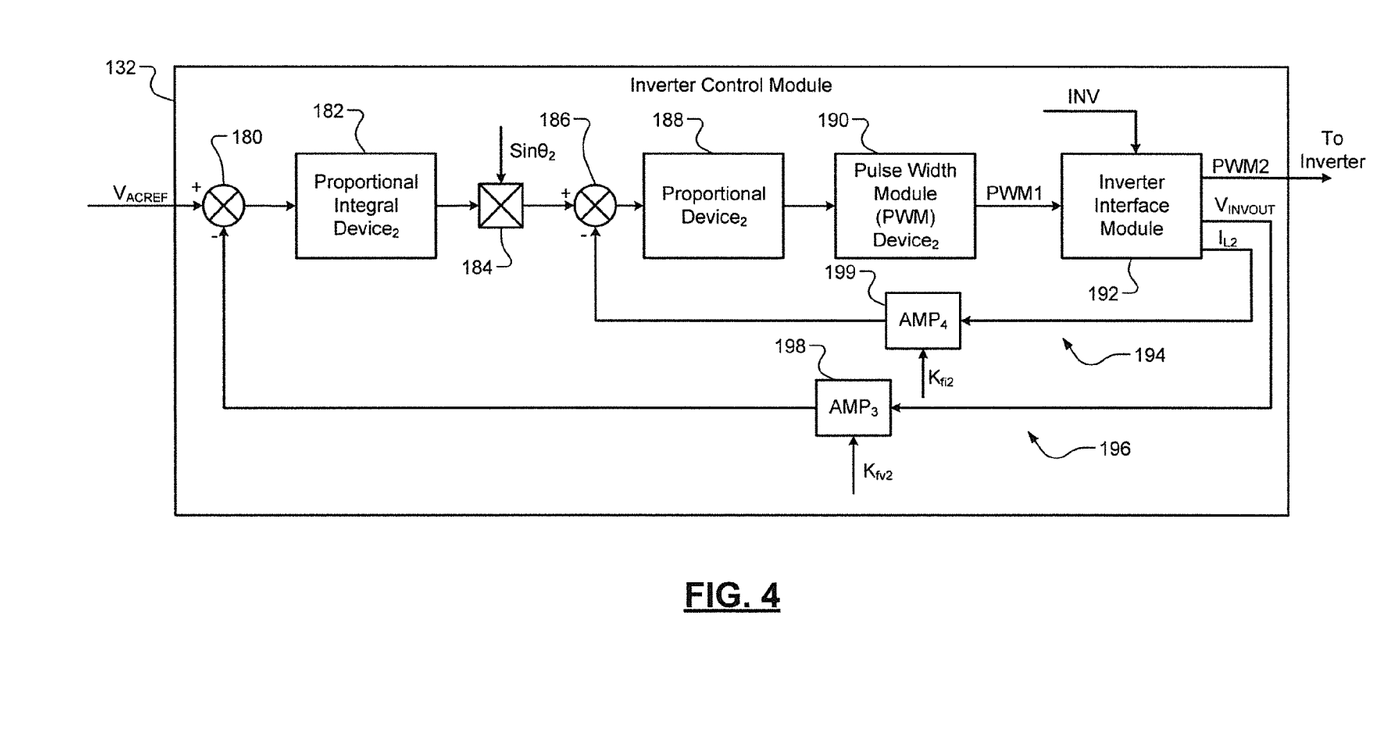
FIG. 4 is a functional block diagram of an inverter control module in accordance with an aspect of the present disclosure.

The RI control circuit 116 may further include a scale module 122. The scale module 122 may generate scale value signals $K_{fi1}$, $K_{fv1}$, $K_{fi2}$, $K_{fv2}$ based on the second mode signal $MODE_2$. The scale value signals $K_{fi1}$, $K_{fv1}$, $K_{fi2}$, $K_{fv2}$ may be used by amplifiers of the RI control circuit 116. The scale value signals $K_{fi1}$, $K_{fv1}$, $K_{fi2}$, $K_{fv2}$ may have a first set of scale values when operating in the bypass mode and may have a second set of scale values when operating in the adaptive voltage control mode. The amplifiers are shown in FIGS. 3 and 4.

The RI control circuit 116 includes a voltage reference module 124, a first switch module 126, a second switch module 128, a rectifier control module 130, and an inverter control module 132. The voltage reference module 124 selects a DC voltage reference and an AC voltage reference for each of the bypass mode and the adaptive voltage control mode of the UPS mode based on the voltage setting signal SetVolt(s) and/or predetermined voltages and current levels 134 stored in the memory 120. As an example, the voltage reference module 124 may select a first DC voltage reference DC1 and a first AC voltage reference AC1 for the normal UPS mode and/or adaptive voltage control mode. The first AC voltage reference may be equal to the first AC voltage $V_{ACIN}$ also referred to as the static bypass voltage as discussed above. The voltage reference module 124 may select a second DC voltage reference DC2 and a second AC voltage reference AC2 for the adaptive voltage control mode. The adaptive voltage control mode may utilize any number of associated DC and AC voltage references.

The first switch module 126 selects one of the first and second DC voltage references DC1, DC2 based on the second mode signal $MODE_2$ and generates a DC voltage reference signal $V_{DCREF}$. The DC voltage reference signal $V_{DCREF}$ indicates the selected DC voltage. The second switch module 128 selects one of the first and second AC voltage references AC1, AC2 based on the second mode signal $MODE_2$ and generates an AC voltage reference signal $V_{ACREF}$. The AC voltage reference signal $V_{ACREF}$ indicates the selected AC voltage.

The rectifier control module 130 receives the DC voltage reference signal $V_{DCREF}$, and the DC bus voltage signal $V_{RECTOUT}$. The rectifier control module 130 may also receive a rectifier signal RECT and the scale value signals $K_{fi1}$, $K_{fv1}$. The rectifier signal RECT may include a line current signal $I_{L1}$ (shown in FIG. 3) and the DC bus voltage signal $V_{RECTOUT}$. The line current signal $I_{L1}$ may indicate the amount of current received by the load 14 as a voltage and may be equal to one or more of the current signals $I_{RECTIN}$, $I_{RECTOUT}$, $I_{INVIN}$, and $I_{INVOUT}$. Although not shown, the rectifier control module 130 may also receive and/or monitor the current signals $I_{RECTIN}$, $I_{RECTOUT}$.

The rectifier control module 130 monitors states of the rectifier 20 and controls operation of the rectifier 20 based on the states. For example, the rectifier control module 130 may control operation of the rectifier 20 based on the voltage signals $V_{RECTIN}$, $V_{RECTOUT}$ and the current signals $I_{RECTIN}$, $I_{RECTOUT}$. In the example shown, the rectifier control module 130 controls operation of the rectifier 20 and generates a first PWM signal PWM1 based on the rectifier signal RECT, the DC bus voltage signal $V_{RECTOUT}$, the DC voltage reference signal $V_{DCREF}$, the line current signal $I_{L1}$ and/or the scale value signals $K_{fi1}$, $K_{fv1}$. The first PWM signal PWM1 signal is transmitted to the rectifier 20 and may control the output voltage of the rectifier 20 (i.e. the DC bus voltage $V_{RECTOUT}$).

The inverter control module 132 receives the AC voltage reference signal $V_{ACREF}$ and the third AC voltage signal $V_{INVOUT}$. The inverter control module 132 may also receive an inverter signal INV and the scale value signals $K_{fi2}$, $K_{fv2}$. The inverter signal INV may include the line current signal $I_{L1}$ and the third AC voltage signal $V_{INVOUT}$. Although not shown, the inverter control module 132 may also receive and/or monitor the current signals $I_{INVIN}$, $I_{INVOUT}$. The inverter control module 132 monitors states of the inverter 22 and controls operation of the inverter 22 based on the states. For example, the inverter control module 132 may control operation of the inverter 22 based on the voltage signals $V_{INVIN}$, $V_{INVOUT}$ and the current signals $I_{INVIN}$, $I_{INVOUT}$. In the example shown, the inverter control module 132 controls operation of the inverter 22 and generates a second PWM signal PWM2 based on the inverter signal INV, the third AC voltage signal $V_{INVOUT}$, the AC voltage reference signal $V_{ACREF}$, the line current signal $I_{L1}$ and/or the scale value signals $K_{fi2}$, $K_{fv2}$. The second PWM signal $PWM_2$ is transmitted to the inverter 22 and may control the output voltage of the inverter 22 (i.e. the third AC voltage $V_{INVOUT}$).

The bypass control module 106 includes a bypass switch module 140 that controls operation of the bypass switch 26. The bypass switch module 140 generates the bypass control signal BYPASS based on the second mode signal $MODE_2$, the control signal AUTO/MAN, the enable signal ENABLE, the first AC voltage signal $V_{ACIN}$, and/or the AC output voltage signal $V_{ACOUT}$.

In FIG. 3, the rectifier control module 130 is shown. The rectifier control module 130 includes a first summer 150, a first proportional integral device 152, a first multiplier 154, a second summer 156, a first proportional device 158, a first PWM device 160, a rectifier interface module 162, a first current feedback loop 164 and a first voltage feedback loop 166. The first summer 150 sums the DC reference voltage $V_{DCREF}$ with an output of the first voltage feedback loop 166. The first proportional integral device 152 generates a first proportional integral value based on output of the first summer 150. The first multiplier 154 multiplies the first proportional integral value by a first phase signal $Sin\theta_1$. The second summer 156 sums output of the first multiplier 154 with output of the first current feedback loop 164. The first proportional device 158 generates a first proportional value based on output of the second summer 156.

The first PWM device 160 generates the first PWM signal PWM1 based on the first proportional value generated by the first proportional device 158. The rectifier interface module 162 receives at least the rectifier signal RECT and the first PWM signal PWM1 and generates, transmits and/or outputs the first PWM signal PWM1, the DC bus voltage signal $V_{RECTOUT}$, and the line current signal $I_{L1}$. The rectifier signal RECT may be received from the rectifier 20. The first PWM signal PWM1 is transmitted to the rectifier 20.

The first voltage feedback loop 166 may include a first voltage amplifier 170 and be used to maintain an output voltage of the rectifier 20. The first voltage amplifier 170 amplifies the DC bus voltage signal $V_{RECTOUT}$ based on the scale value $K_{fv1}$. The first current feedback loop 164 may include a second voltage amplifier 172 and be used to maintain a current level of the rectifier 20. The second voltage amplifier 172 may amplify the DC bus voltage signal $V_{RECTOUT}$ based on the scale value $K_{fi1}$.

In FIG. 4, the inverter control module 132 is shown. The inverter control module 132 includes a third summer 180, a second proportional integral device 182, a second multiplier 184, a fourth summer 186, a second proportional device 188, a second PWM device 190, an inverter interface module 192, second current feedback loop 194 and a second voltage feedback loop 196. The third summer 180 sums the AC reference voltage $V_{ACREF}$ with an output of the second voltage feedback loop 196. The second proportional integral device 182 generates a second proportional integral value based on output of the third summer 180. The second multiplier 184 multiplies the second proportional integral value by a second phase signal $Sin\theta_2$. The fourth summer 186 sums output of the second multiplier 184 with output of the second current feedback loop 194. The second proportional device 188 generates a proportional value based on output of the fourth summer 186.

The second PWM device 190 generates the second PWM signal PWM2 based on the second proportional value generated by the second proportional device 188. The inverter interface module 192 receives at least the inverter signal INV and the second PWM signal PWM2 and generates, transmits and/or outputs the second PWM signal PWM2, the third AC voltage signal $V_{INVOUT}$, and the line current signal $I_{L1}$. The inverter signal INV may be received from the inverter 22. The second PWM signal PWM2 is transmitted to the inverter 22.

The second voltage feedback loop 196 may include a third voltage amplifier 198 and be used to maintain an output voltage of the inverter 22. The third voltage amplifier 198 amplifies the third AC voltage signal $V_{INVOUT}$ based on the scale value $K_{fv2}$. The second current feedback loop 194 may include a fourth voltage amplifier 199 and be used to maintain a current level of the inverter 22. The fourth voltage amplifier 199 may amplify the AC voltage signal $V_{INVOUT}$ based on the scale value $K_{fi2}$.

In FIG. 5, a modular UPS control system 200 is shown. The modular UPS control system 200 includes UPSs 202 with UPS control circuit(s) (one UPS control circuit 204 is shown) and UPS power circuit(s) (one UPS power circuit 206 is shown). The UPSs 202 may be connected in parallel to provide a single output voltage to one or more loads (not shown). Each of the UPS control circuit(s) may include a monitor control circuit 208, one or more power control circuits 210 and a bypass control circuit 212. When the UPSs 202 include only a single power control circuit, the UPSs may be referred to as monolithic UPSs. A system with multiple monolithic UPSs may be referred to as a multi-UPS system.

The monitor control circuit 208 includes a monitor control module 214 (e.g., the monitor control module 102 of FIG. 2) and a monitor interface circuit 216. The monitor interface circuit 216 may include a user interface module and a display as shown in FIG. 1.

The power control circuits 210 include respective power control modules 218 (e.g., the power control module 104 of FIG. 2) and RI power circuits 220. The power control circuits 210 may control the RI power circuits 220, which are connected in parallel. Each of the RI power circuits 220 may include input and output transformers, a rectifier and an inverter as shown in FIG. 1. The number of power control circuits 210 and corresponding RI power circuits may vary per application based on power requirements. As an example, each RI power circuit may be used to provide 15 kilovolt-ampere (KVA). If three RI power circuits are used in a UPS, the UPS may provide 45 KVA. Each of the RI power circuits 220 may include one or more of each of the following: an input transformer; an output transformer; a rectifier; and an inverter. Rectifier and inverter pairs may be connected in parallel and the number of rectifier and inverter pairs may be based on power requirements of an application. Example input and output transformers, a rectifier and an inverter are shown in FIG. 1.

The bypass control circuit 212 includes a bypass control module 222 (e.g., the bypass control module 106 of FIG. 2) and a bypass switch 224 (e.g., the bypass switch 26 of FIG. 1).

The control modules 214, 218 and 222 of the UPSs 202 may communicate with each other via a monitor CAN 250 and/or via a parallel CAN 252. The monitor CAN 250 may be used to communicate user selected values and parameters including, for example, selected automatic or manual modes, enablement or disablement of the adaptive voltage control mode, used voltage settings (e.g., the voltages of the voltage setting signal SetVolt(s)), the predetermined and stored voltages and current levels disclosed above, etc. Each of the control modules 214, 218 and 222 may have respective storage devices (not shown), such as memories or registers, to store the values and parameters.

The parallel CAN 252 may be used to share current and voltage states of the rectifiers, inverters and transformers of the RI power circuits 220 with each other. These states may be shared to determine, monitor and adjust current and/or voltage output of the RI power circuits 220 and/or loads on each of the RI power circuits 220. The current and/or voltage outputs of the RI power circuits 220 and/or the loads on the RI power circuits 220 may be regulated and adjusted to match each other. The parallel CAN 252 may also be used to share timing of when a switch between operating modes is to occur. This ensures that the RI power circuits 220 switch between the operating modes (e.g., between the bypass and UPS modes and in the UPS mode, between the normal UPS and adaptive voltage control modes) during the same operating period and/or at the same time. This may include ramping up or down output voltages of the UPSs 202 during the same period. The parallel CAN 252 may also be used to share frequency information with respect to each of the RI power circuits 220. The output frequency of each of the RI power circuits 220 may be matched (i.e. the frequencies of the outputs of the RI power circuits 220 is the same).

Figure 6:
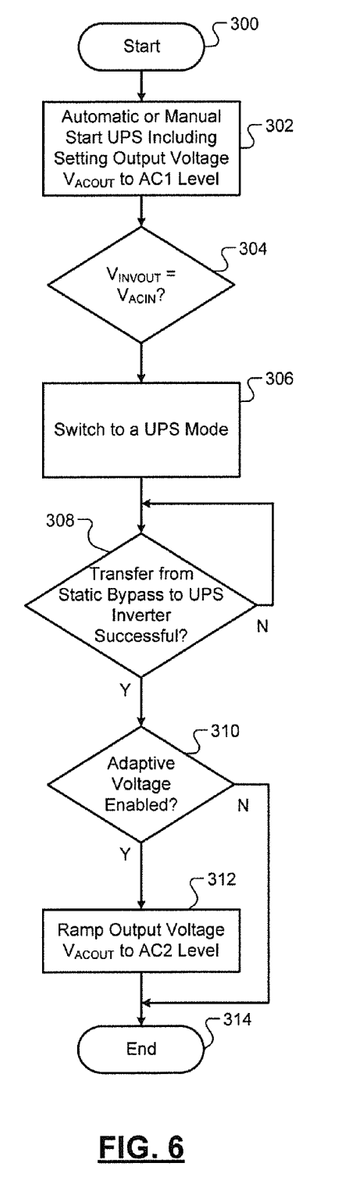
FIG. 6 is a flow chart of a method of adaptively adjusting output voltage of a UPS in accordance with an aspect of the present disclosure.
Figure 7:
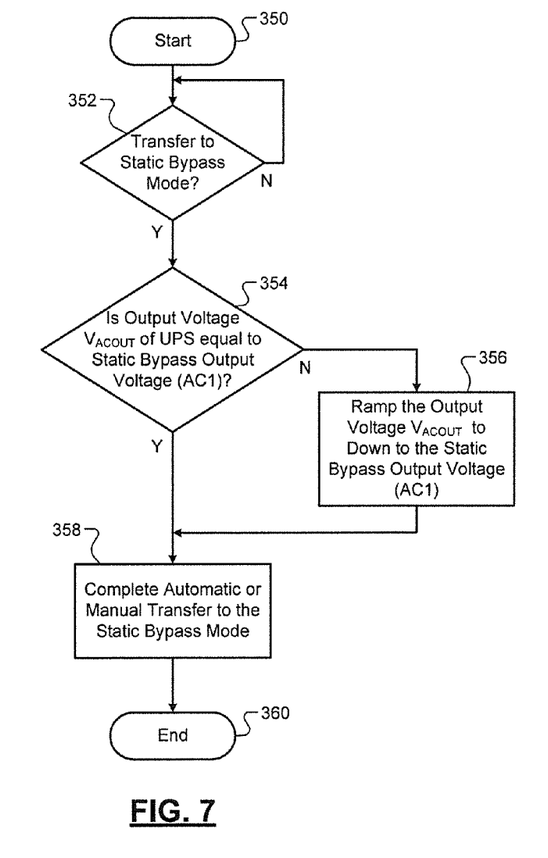
FIG. 7 is a flow chart of a method of switching to a bypass mode in accordance with an aspect of the present disclosure.
Figure 8:
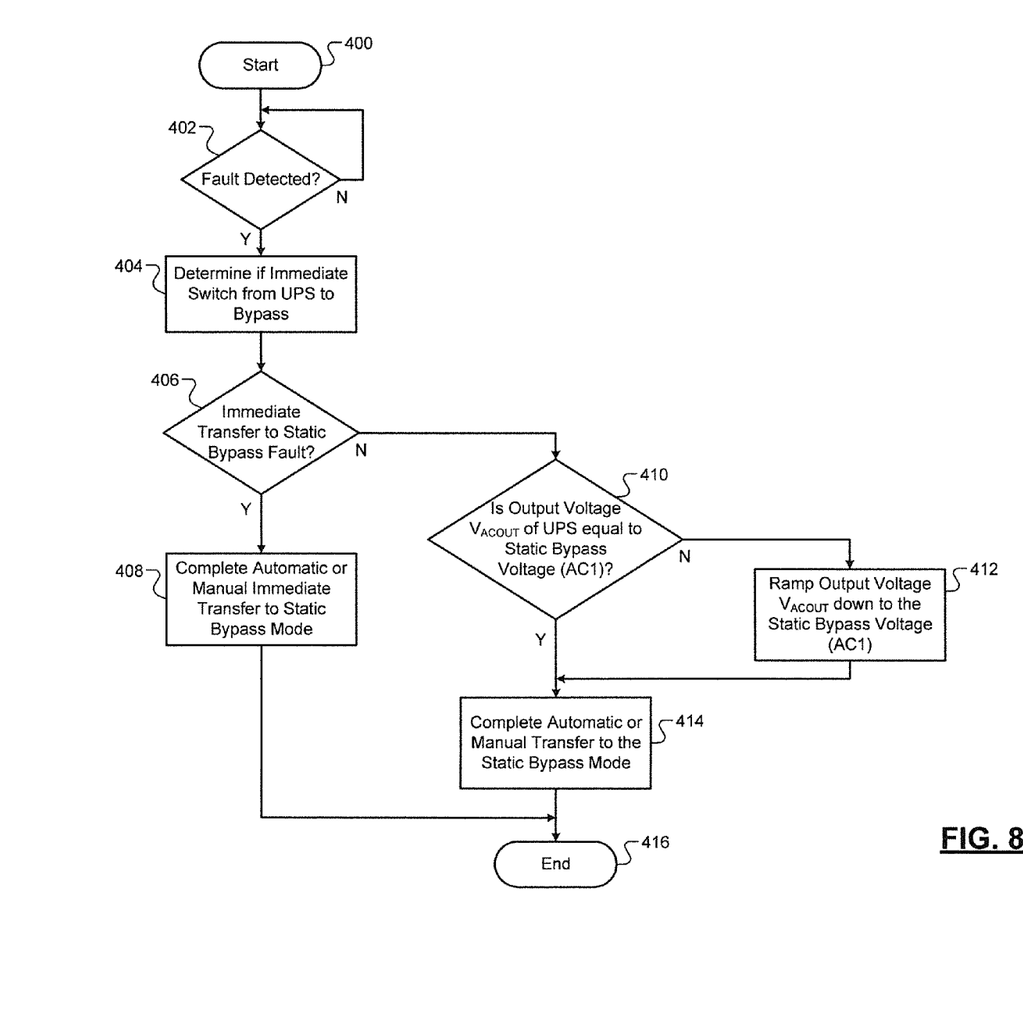
FIG. 8 is a flow chart of a method of switching to a bypass mode in the event of a fault in accordance with an aspect of the present disclosure.

The UPSs 202 described above may be operated using numerous methods, examples of which are shown in FIGS. 6-8. In FIG. 6, a flow chart of a method of adaptively adjusting output voltage of a UPS (e.g., the UPS 12 of FIG. 1) is shown.

Although the following tasks are primarily described with respect to the implementations of FIGS. 1-5, the tasks may be easily modified to apply to other implementations of the present disclosure. The tasks may be iteratively performed. The method may begin at 300.

At 302, the UPS 12 is automatically or manually started. This includes increasing the output voltage of the inverter 22 and/or the output transformer 30 to a static bypass voltage. Output voltages of the devices of the UPS 12, such as the output voltages of the rectifier 20 and the inverter 22 may be selected via the user interface module 50 or based on predetermined initial output voltages stored in the memory 120. The output voltages may include the first DC bus voltage (e.g., DC1) and the static bypass voltage (e.g., AC1). While the output voltages of the inverter 22 and the output transformer 30 are being increased, the UPS 12 is in the bypass mode and the bypass switch 26 is in its bypass state. This provides the utility or substation power at the first AC voltage $V_{ACIN}$ directly to the load 14 through the bypass switch 26.

At 304, the adaptive voltage control module 114 and/or the bypass control module 106 determines whether the third AC voltage (or output voltage of the inverter 22) $V_{INVOUT}$ is equal to (matches) or approximately equal to (i.e. within a predetermined range from) the first AC voltage $V_{ACIN}$. Task 306 is performed when the output voltage $V_{INVOUT}$ matches or is approximately equal to the first AC voltage $V_{ACIN}$. At 306, the adaptive voltage control module 114 may switch the operating mode from the bypass mode to the UPS mode. The bypass control module 106 and/or the bypass switch module 140 generates the bypass signal BYPASS to change state of the bypass switch 26 to no longer bypass the rectifier 20, the inverter 22, and the transformers 28, 30.

At 308, the adaptive voltage control module 114 may determine whether the bypass switch 26 has successfully switched from static bypass to the inverter 22. This may be determined based on, for example, current levels and/or voltages of the rectifier 20 and the inverter 22.

At 310, the adaptive voltage control module 114 determines whether the adaptive voltage control mode is enabled. This may be determined based on the enable signal ENABLE when in the manual mode or the automatic mode. If the adaptive voltage control mode is enabled, task 312 is performed, otherwise the method may remain in the normal UPS mode and end at 314.

When the adaptive voltage control mode is enabled, task 312 is performed. At 312, the UPS control module 18 and/or the inverter control module 132 increases the AC output voltage $V_{ACOUT}$ from the static bypass voltage AC1 to a voltage equal to the second AC voltage reference AC2 (e.g., 240 VAC), which is also the set adaptive voltage discussed above. The inverter control module 132 may ramp up the AC output voltage $V_{ACOUT}$ from the static bypass voltage to a voltage equal to the second AC voltage reference AC2. The rectifier control module 130 may switch, increase, and/or ramp the first DC voltage reference DC1 to the second DC voltage reference DC2 prior to and/or while the inverter control module 132 increases and/or ramps up the AC output voltage $V_{ACOUT}$. The increasing and/or ramping up of the AC output voltage $V_{ACOUT}$ may be performed over a predetermined period of time. The method may end at 314 when task 312 is complete.

In FIG. 7, a flow chart of a method of switching to the bypass mode is shown. Although the following tasks are primarily described with respect to the implementations of FIGS. 1-5, the tasks may be easily modified to apply to other implementations of the present disclosure. The tasks may be iteratively performed. The method may begin at 350.

At 352, if the adaptive voltage control module 114 switches from the UPS mode to the bypass mode, task 354 is performed. The adaptive voltage control module 114 may switch to the bypass mode based the control signal AUTO/MAN, the enable signal ENABLE, a change in load(s), etc.

At 354, the adaptive voltage control module 114 determines if the AC output voltage $V_{ACOUT}$ is equal to the first AC voltage $V_{ACIN}$. It should be understood that exact equality is not required, and $V_{ACOUT}$ is considered equal to $V_{ACIN}$ if they are approximately equals. If the AC output voltage $V_{ACOUT}$ is not equal to the first AC voltage $V_{ACIN}$, then task 356 is performed, otherwise task 358 is performed.

If the AC output voltage $V_{ACOUT}$ is not equal to the first AC voltage $V_{ACIN}$, then at 356 the inverter control module 132 decreases and/or ramps down the AC output voltage $V_{ACOUT}$ to match or be approximately equal to the static bypass voltage. This may include a gradual decrease in the AC output voltage $V_{ACOUT}$. The gradual decrease in the AC output voltage $V_{ACOUT}$ may include incrementally decreasing the AC output voltage $V_{ACOUT}$ over a predetermined period of time, resulting in the AC output voltage $V_{ACOUT}$ matching or being approximately equal to the static bypass voltage. The rectifier control module 130 may switch, decrease and/or ramp down the DC bus voltage from the second DC voltage reference DC2 to the first DC voltage reference DC1. The rectifier control module 130 may switch, decrease and/or ramp down the DC bus voltage prior to and/or while the inverter control module 132 decreases and/or ramps down the AC output voltage $V_{ACOUT}$. The decreasing and/or ramping down of the DC bus voltage and the AC output voltage $V_{ACOUT}$ may occur over a predetermined period of time.

Task 358 is performed when the AC output voltage $V_{ACOUT}$ matches or is approximately equal to the static bypass voltage. This allows for an uninterrupted power switch and/or prevents a sudden decrease in voltage to the load 14 during a switch from UPS mode to bypass mode. At 358, the bypass control module 106 and/or the bypass switch module 140 switches the bypass switch 26 from its non-bypass state to its bypass state. In the bypass state, the bypass switch 26 provides the first AC voltage $V_{ACIN}$ to the output of the UPS 12 and/or the AC load 14. The method may end at 360.

In FIG. 8, a flow chart of a method of switching to the bypass mode in the event of a fault is shown. Although the following tasks are primarily described with respect to the implementations of FIGS. 1-5, the tasks may be easily modified to apply to other implementations of the present disclosure. The tasks may be iteratively performed. The method may begin at 400.

At 402, the fault detection module 112 determines whether a fault is detected. If a fault is detected task 404 is performed. The fault detection module 112 in detecting a fault may determine the type of fault and generate the fault detection signal FAULT. The fault detection module 112 detects the fault and determines the type of the fault based on one or more of the voltages and current levels $V_{ACIN}$, $V_{ACOUT}$, $V_{RECTIN}$, $V_{RECTOUT}$, $V_{INVIN}$, $V_{INVOUT}$, SetVolt(s), $I_{RECTIN}$, $I_{RECTOUT}$, $I_{INVIN}$, and $I_{INVOUT}$ and/or the predetermined and stored voltages and current levels stored in the memory 120. The type of fault may refer to a fault associated with any one or more of the devices of the UPS 12, including the rectifier 20, the inverter 22, and the transformers 28, 30. The types of faults may include improper input and/or output current and/or voltage levels, improper frequencies, improper noise levels, erratic current and/or voltage levels, etc. The fault detection signal FAULT may indicate that a fault has occurred and the type of the fault.

At 404, the adaptive voltage control module 114 may determine whether an immediate switchover from the UPS mode to bypass mode should be performed. This determination is made based on the fault detection signal FAULT. An immediate switch over refers to a switchover without a controlled ramping down of the AC output voltage $V_{ACOUT}$ prior to the switch to the bypass mode. An immediate switchover may be performed, for example, when the rectifier 20 and/or the inverter 22 are operating improperly and are unable to provide the appropriate current and/or voltage output levels. For example, if the inverter 22 is operating improperly to ramp down to the static bypass voltage, an immediate switchover may be performed. A fault that calls for an immediate switchover from the UPS mode to the bypass mode may be referred to as an immediate fault.

At 406, the adaptive voltage control module 114 switches to the bypass mode and performs task 408 when an immediate switchover to the bypass state is to be performed. The adaptive voltage control module 114 delays the switchover from being performed and performs task 410 when an immediate switchover is not performed. At 408, the bypass control module 106 and/or the bypass switch module 140 switches the bypass switch 26 to the bypass state. The method may end at 416 subsequent to a switch over to the bypass state.

At 410, the adaptive voltage control module 114 and/or the bypass switch module 140 determines whether the AC output voltage $V_{ACOUT}$ is equal to (matches) or approximately equal to (within a predetermined range of) the static bypass voltage. If the fourth AC voltage $V_{ACOUT}$ does not match or is approximately equal to (within a predetermined range from) the first AC voltage $V_{ACIN}$ than task 412 is performed, otherwise task 414 is performed.

At 412, the inverter control module 132 decreases and/or ramps down the fourth AC voltage $V_{ACOUT}$ to match or be approximately equal to the static bypass voltage. The rectifier control module 130 may switch, decrease and/or ramp down the DC bus voltage from the second DC voltage reference DC2 to the first DC voltage reference DC1. The rectifier control module 130 may switch, decrease and/or ramp down the DC bus voltage prior to and/or while the inverter control module 132 decreases and/or ramps down the fourth AC voltage $V_{ACOUT}$.

Task 414 is performed when the fourth AC voltage $V_{ACOUT}$ matches or is approximately equal to the static bypass voltage. This allows for uninterrupted power switch and/or a sudden decrease in voltage to the AC load 14 during a switch from UPS mode to bypass mode. At 414, the bypass switch module 140 switches the bypass switch 26 from a non-bypass state to a bypass state. The method may end at 416.

The above-described tasks of FIGS. 6-8 are meant to be illustrative examples; the tasks may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. An uninterruptible power supply comprising:
   a rectifier coupled to an input of the uninterruptible power supply and converting a first alternating current having a first alternating current voltage to a direct current provided to a direct current bus;

an inverter coupled to an output of the uninterruptible power supply and converting direct current provided by the direct current bus to an second alternating current having a second alternating current voltage;

a bypass switch having a bypass state and a non-bypass state, wherein the bypass switch is configured to bypass the rectifier and the inverter and provide a bypass voltage from the input to the output when in the bypass state; and a control module that operates in a bypass mode and a UPS mode, wherein the control module switches the bypass switch to the bypass state when in the bypass mode and switches the bypass switch to the non-bypass state when in the UPS mode, wherein the control module, when in the UPS mode, further operates in a normal UPS mode and an adaptive voltage control mode, and wherein the control module, when operating in the adaptive voltage control mode, adjusts the second alternating current voltage from a first level to a second level upon switching from the bypass mode to the UPS mode.

2. The uninterruptible power supply of claim 1, wherein the control module maintains the second alternating current voltage at the first level when in at least one of the bypass mode and the normal UPS mode.

3. The uninterruptible power supply of claim 1, wherein the control module ramps the second alternating current voltage from the first level to the second level while operating in the adaptive voltage control mode.

4. The uninterruptible power supply of claim 1, further comprising a fault detection module that monitors at least one parameter of a device of the uninterruptible power supply and generates a fault signal based on the at least one parameter, wherein the control module adjusts the second alternating current voltage from the second level to the first level based on the fault signal.

5. The uninterruptible power supply of claim 4, wherein:
the fault detection module determines a type of the fault and indicates the type of the fault in the fault signal; and
the control module switches the bypass switch from the non-bypass state to the bypass state based on the type of the fault.

6. The uninterruptible power supply of claim 5, wherein the control module:
determines whether a switch over from the adaptive voltage control mode to the bypass mode is to be performed without a gradual decrease in the second alternating current voltage based on the type of the fault;
gradually decreases the second alternating current voltage from the second level to the first level and switches the bypass switch from the non-bypass state to the bypass state when the fault is of a first type; and
switches the bypass switch from the non-bypass state to the bypass state and adjusts the second alternating current from the second level to the first level without gradually decreasing the second alternating current voltage from the second level to the first level when the fault is of a second type.

7. The uninterruptible power supply of claim 6, wherein the control module:
determines whether at least one of the second alternating current voltage and an output voltage of the uninterruptible power supply matches at least one of an input voltage of the uninterruptible power supply and the first alternating current voltage; and
switches the bypass switch from the non-bypass state to the bypass state when the at least one of the second alternating current voltage and the output voltage of the uninterruptible power supply matches the at least one of the input voltage of the uninterruptible power supply and the first alternating current voltage.

8. The uninterruptible power supply of claim 5, wherein the control module:
determines whether an immediate switchover from the adaptive voltage control mode to the bypass mode is to be performed based on the type of the fault;
ramps down the second alternating current voltage from the second level to the first level and switches the bypass switch from the non-bypass state to the first bypass state when the fault is not an immediate fault; and
switches the bypass switch from the non-bypass state to the bypass state and adjust the second alternating current voltage from the second level to the first level without ramping down the second alternating current voltage from a second voltage reference to the first level when the fault is an immediate fault.

9. The uninterruptible power supply of claim 8, wherein:
the at least one device comprises the rectifier and the inverter; and
the immediate fault refers to a fault of at least one of the rectifier and the inverter.

10. The uninterruptible power supply of claim 1, further comprising an interface module that:
generates a control signal indicating operation in a selected one of an automatic mode or a manual mode; and
generates an enable signal indicating whether the adaptive voltage control mode is enabled,
wherein the control module switches between operating in the bypass mode and the adaptive voltage control mode and switches the bypass switch between the bypass state and the non-bypass state based on the control signal and the enable signal.

11. The uninterruptible power supply of claim 1, wherein the control module comprises:
a monitor control module that
generates a control signal indicating operation in a selected one of an automatic mode or a manual mode, and
generates an enable signal indicating whether the adaptive voltage control mode is enabled;
a power control module that
monitors devices of the uninterruptible power supply and generates a fault signal when there is a fault in the uninterruptible power supply, and
switches between the bypass mode and the adaptive voltage control mode based on the control signal, the enable signal, and the fault signal; and
a bypass switch control module that switches the bypass switch between the first bypass state and the non-bypass state based on the control signal, the enable signal, and the fault signal.

12. The uninterruptible power supply of claim 11, wherein:
the monitor control module generates a voltage setting signal; and
the power control module adjusts a voltage of the direct current bus and the second alternating current voltage based on the voltage setting signal.

13. The uninterruptible power supply of claim 11, wherein the power control module:
generates a first set of scale values and a second set of scale values;
operates feedback loops of the rectifier and the inverter based on the first set of scale values when operating in the bypass mode; and operates feedback loops of the rectifier and the inverter based on the second set of scale values when operating in the adaptive voltage control mode.

14. The uninterruptible power supply of claim 1, further comprising:
a voltage control module that selects an operating mode to be one of the bypass mode and the adaptive voltage control mode;
a voltage reference module that generates at least one direct current signal and at least one alternating current signal, wherein the at least one direct current signal indicates a plurality of direct current voltages, and wherein the at least one alternating current signal indicates a plurality of alternating current voltages;
a first switch module that selects one of the plurality of direct current voltages and generates a direct current reference voltage based on the operating mode; and
a second switch module that selects one of the plurality of alternating current voltages and generates a second reference voltage based on the operating mode.

15. The uninterruptible power supply of claim 14, further comprising:
a rectifier control module that adjusts a voltage of the direct current bus to match the direct current reference voltage; and
an inverter control module that adjusts the second alternating current voltage to match the second reference voltage.

16. A method of operating an uninterruptible power supply comprising:
converting a first alternating current at a first alternating current voltage to a direct current via a rectifier;
converting the direct current to a second alternating current at a second alternating current voltage via an inverter;
determining whether to operate in a bypass mode or a UPS mode;
switching a bypass switch to a bypass state when in the bypass mode;
bypassing the rectifier and the inverter when operating in the bypass mode by providing power at a bypass voltage from an input of the uninterruptible power supply through the bypass switch to an output of the uninterruptible power supply when in the bypass mode;
switching the bypass switch to a non-bypass state when in the UPS mode; and
when operating in an adaptive control mode in the UPS mode, adjusting the second alternating current voltage between a first voltage level and a second voltage level after switching from the bypass mode to the UPS Mode.

17. The method of claim 16, further comprising:
monitoring at least one parameter of a device of the uninterruptible power supply and generating a fault signal based on the parameter; and
adjusting the second alternating current voltage from the second voltage level to the first voltage level based on the fault signal.

18. The method of claim 17, further comprising:
determining a type of the fault and indicating the type of the fault in the fault signal; and
switching the bypass switch from the non-bypass state to the bypass state based on the type of the fault.

19. The method of claim 18, further comprising:
determining whether a switchover from an adaptive voltage control mode to the bypass mode is to be performed without a gradual decrease in the second alternating current voltage based on the type of the fault;
gradually decreasing the second alternating current voltage from the second voltage level to the first voltage level and switching the bypass switch from the non-bypass state to the bypass state when the fault is of a first type; and
switching the bypass switch from the non-bypass state to the bypass state without gradually decreasing the second alternating current voltage from the second voltage level to the first voltage level when the fault is of a second type.

20. The method of claim 19, further comprising:
determining whether at least one of the second alternating current voltage and an output voltage of the uninterruptible power supply matches at least one of an input voltage of the uninterruptible power supply and the first alternating current voltage; and
switching the bypass switch from the non-bypass state to the bypass state when the at least one of the second alternating current voltage and the output voltage of the uninterruptible power supply matches the at least one of the input voltage of the uninterruptible power supply and the first alternating current voltage.

* * * * *